(12) United States Patent
Sigling

(10) Patent No.: US 7,063,817 B2
(45) Date of Patent: Jun. 20, 2006

(54) DEVICE FOR CLEANING FLUE GAS

(75) Inventor: Ralf Sigling, Alpharetta, GA (US)

(73) Assignee: Siemens Aktiengesellschaft, Munich (DE)

( * ) Notice: Subject to any disclaimer, the term of this patent is extended or adjusted under 35 U.S.C. 154(b) by 488 days.

(21) Appl. No.: 10/035,867

(22) Filed: Dec. 31, 2001

(65) Prior Publication Data

US 2002/0081241 A1    Jun. 27, 2002

Related U.S. Application Data

(63) Continuation of application No. PCT/DE00/02107, filed on Jun. 28, 2000.

(30) Foreign Application Priority Data

Jun. 29, 1999    (DE) ................................ 199 29 765

(51) Int. Cl.
*B01D 50/00* (2006.01)

(52) U.S. Cl. .................................... 422/171; 423/239.1

(58) Field of Classification Search ........ 422/168–183, 422/171; 259/4; 110/347; 423/239.1; 366/181.5
See application file for complete search history.

(56) References Cited

U.S. PATENT DOCUMENTS

| | | | | |
|---|---|---|---|---|
| 3,785,620 A | * | 1/1974 | Huber | 366/175.2 |
| 5,078,973 A | * | 1/1992 | Kuroda et al. | 422/171 |
| 5,423,272 A | * | 6/1995 | Dunn et al. | 110/347 |
| 5,437,851 A | * | 8/1995 | MacInnis | 423/239.1 |
| 6,086,241 A | * | 7/2000 | Herr et al. | 366/181.5 |

FOREIGN PATENT DOCUMENTS

| | | |
|---|---|---|
| DE | G 86 19 685.5 | 10/1986 |
| DE | 43 09 460 A1 | 9/1994 |
| DE | 44 35 103 A1 | 4/1996 |
| DE | 197 04 608 C1 | 6/1998 |
| JP | 10 151 324 | 6/1998 |
| JP | 10151324 A * | 6/1998 |

* cited by examiner

*Primary Examiner*—Glenn Caldarola
*Assistant Examiner*—Tom P. Duong
(74) *Attorney, Agent, or Firm*—Laurence A. Greenberg; Werner H. Stemer; Ralph E. Locher

(57) ABSTRACT

Flue gas, in particular from a steam generator, requires cleaning. A catalytic converter for deNOxing the flue gas, which is used, for example, to heat an air preheater, is often employed for this purpose. Residues of a reducing agent react with unconverted sulfur oxide and form a substance which damages the air preheater. To suppress this reaction, there is provided a first mixer for more uniformly mixing the flue gas with the reducing agent downstream of the catalytic converter, as seen in the direction of flow.

12 Claims, 2 Drawing Sheets

DEVICE FOR CLEANING FLUE GAS

CROSS-REFERENCE TO RELATED APPLICATION

This application is a continuation of copending International Application No. PCT/DE00/02107, filed Jun. 28, 2000, which designated the United States.

BACKGROUND OF THE INVENTION

Field of the Invention

The invention relates to a device for cleaning flue gas, in particular flue gas from a fossil-fuel-fired steam generator in a power plant. The device has an apparatus for injecting an additive which releases a reducing agent, and a catalytic converter for the reduction of nitrogen oxides.

When cleaning flue gas, for example from a steam generator, ammonia or an additive, for instance urea, which releases a reducing agent of this type is usually employed as reducing agent when reducing the levels of nitrogen oxide by catalytic action. The ammonia which is introduced into the flue gas upstream of a catalytic converter reacts with nitrogen oxides, in particular NO and/or $NO_2$, at the catalytic converter which is fitted in a reactor, to form nitrogen ($N_2$) and water ($H_2O$). A small proportion of the ammonia which has been injected or introduced often remains in the flue gas downstream of the catalytic converter. This effect is termed ammonia slippage. Ammonia slippage is essentially a function of the required degree of separation of nitrogen oxide, of the activity of the catalytic converter, and of the quality of mixing of the injected ammonia with the flue gas. It is also important for the flow through the reactor to be uniform by means of an even flue gas velocity at all locations of the reactor cross section and for it to be possible for all the catalytic converter material to be reached without obstacle.

On an industrial scale, these requirements can only be achieved to a limited extent with acceptable outlay. Consequently, it is inevitable that ammonia slippage may occur distributed unevenly across the cross-section of the reactor. On average, this possible ammonia slippage amounts to only a few ppm. However, at some locations, levels which are a multiple of this average may occur.

There is often a further part of the installation arranged downstream of the catalytic converter, such as an air preheater in a coal power plant. In an air preheater of this type, heat exchange takes place between the flue gases, which are still hot, and combustion air, which is at a cooler temperature. In the process, the flue gas is cooled from more than 300° C. to, for example, approximately 1500° C. The flue gas may contain sulfur oxide ($SO_3$) which is formed from the combustion of the sulfur contained in the fuel. In that temperature range, the sulfur oxide reacts with the ammonia from the ammonia slippage in accordance with the following equation: $2\ NH_3+H_2O+SO_3 \rightarrow (NH_4)_2SO_4$, i.e., to form ammonium sulfate, or according to the equation: $NH_3+SO_3+H_2O \rightarrow NH_4HSO_4$, i.e., to form ammonium hydrogen sulfate.

Ammonium hydrogen sulfate is sticky and it is very corrosive. On account of these properties, it adheres in the part of the installation arranged downstream of the catalytic converter, i.e. in the air preheater, where it may cause blockages and corrosion. Hitherto, this problem has been counteracted by limiting the ammonia slippage to less than 5 ppm, and in some installations even to less than 2 ppm. This entails a correspondingly high outlay for the required catalytic-converter volume. Nevertheless, it is impossible to rule out the possibility of a higher level of ammonia slippage than the mean occurring at some locations over the reactor cross section. Therefore, in some cases a relatively high—even excessively high—ammonia concentration may occur upstream of a certain area of the installation part or air preheater cross section, so that the installation part or the air preheater is damaged in this area by the above-mentioned processes.

The problem of uneven distribution of the ammonia slippage occurs in particular in installations with catalytic converters wherein high levels of nitrogen oxide separation—over 85% up to 95% and above—are to be achieved.

The reason for this is that there may be areas in the cross section of the reactor wherein, although ammonia is available for the reaction, there is no longer any nitrogen oxide present. In these areas, the excess ammonia is no longer broken down, on account of the lack of reaction partners, and remains in the installation as a locally high slippage. This ammonia slippage can no longer be reduced in quantity even by such a large additional catalytic-converter volume.

Measures which have been found to date aimed at solving the above problem consist in intimately mixing the injected ammonia with the flue gas before they enter the catalytic converter and in providing generous dimensions for the catalytic converter itself. Both measures entail not inconsiderable costs yet do not achieve the desired success.

SUMMARY OF THE INVENTION

It is accordingly an object of the invention to provide an improved device for cleaning flue gas, which overcomes the above-mentioned disadvantages of the heretofore-known devices and methods of this general type and which allows no significant reactions between slight residues of sulfur oxides which are still contained in the flue gas and ammonia take place at least upstream of and in an installation part arranged downstream of the catalytic converter, in particular upstream of or in an air preheater.

With the foregoing and other objects in view there is provided, in accordance with the invention, a device for cleaning flue gas, comprising:

a flue gas passage for conducting flue gas in a given flow direction;

an apparatus for injecting an additive adapted to release a reducing agent in said flue gas passage;

a catalytic converter for reducing nitrogen oxides disposed in said flue gas passage; and a mixer for rendering a mixing of the flue gas with the reducing agent more uniform disposed downstream of said catalytic converter in the given flow direction.

In other words, a first mixer for more uniformly mixing the flue gas with the reducing agent is provided downstream of the catalytic converter, as seen in the direction of flow. Even with a catalytic converter which is composed of a plurality of catalytic-converter layers, it is expedient for a (first) mixer of this type to be provided downstream of this catalytic converter. As an alternative, or in addition, it is possible for a mixer to be provided in each case between the catalytic-converter layers.

Downstream of the catalytic converter, the (first) mixer mixes parts of the flue-gas flow wherein the residual level of a reducing agent is still higher than normal with the remaining flue-gas flow. This arrangement leads to uniform mixing of the flue gas with residual ammonia in such a manner that there are no longer any parts of the flue-gas flow with an ammonia content of more than 2 ppm.

If there is an installation part, for example an air preheater, arranged downstream of the catalytic converter, the (first) mixer arranged downstream of the catalytic converter is expediently provided closer to the catalytic converter than to the installation part or air preheater.

In accordance with an added feature of the invention, a further (second) mixer, a diverter device for the flue gas and/or a rectifier for the flue-gas flow are provided in series, as seen in the direction of flow of the flue gas, between the injection apparatus of the cleaning device and the catalytic converter. Moreover, if the catalytic converter is of modular and layered structure, a mixer is expediently provided immediately downstream of at least one catalytic-converter layer, and a rectifier for the flue-gas flow is expediently provided upstream of at least one catalytic-converter layer.

In accordance with an advantageous feature of the invention, the preferably static mixers comprise lamellae which are fitted immovably in a flue-gas passage, and the flue gas flows onto these lamellae at an angle. In this case, the lamellae of a mixer assigned to the catalytic-converter layers are preferably 50 mm to 200 mm wide. The lamellae of the mixer which follows the injection device and of the final mixer before the air preheater or installation part are expediently wider than, preferably twice as wide as, the lamellae in the mixers assigned to the individual layers of the catalytic converter. It is also possible for at least one of the mixers to be designed as a fan and therefore as an active mixer.

In accordance with a concomitant feature of the invention, at least one rectifier is, in the direction of flow of the flue gas, 50 mm to 200 mm high and/or assembled from lamellae, preferably sheet-metal strips which are 1 mm to 4 mm thick, arranged parallel in terms of flow. It is also possible for the lamellae of at least one of the rectifiers to form a grid, preferably with a mesh width of 20 mm to 50 mm, or a grate comprising sheet-metal strips which preferably lie parallel to one another at intervals of 20 mm to 50 mm. In this case, the lamellae of two successive grates are pivoted with respect to one another, preferably through 90°.

The advantages achieved with the invention consist in particular in the fact that, on account of the use of at least one mixer downstream of a catalytic converter, which may be of layered structure, of a cleaning device which has an injection apparatus for a reducing agent, the mixing is made so uniform that in practice homogeneity of the gas mixture comprising flue gas, a remainder of excess ammonia and residues of other gases which are still present is achieved. In this virtually homogeneous mixture, the undesirable reactions mentioned in the introduction no longer take place.

Other features which are considered as characteristic for the invention are set forth in the appended claims.

Although the invention is illustrated and described herein as embodied in a device for cleaning flue gas, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
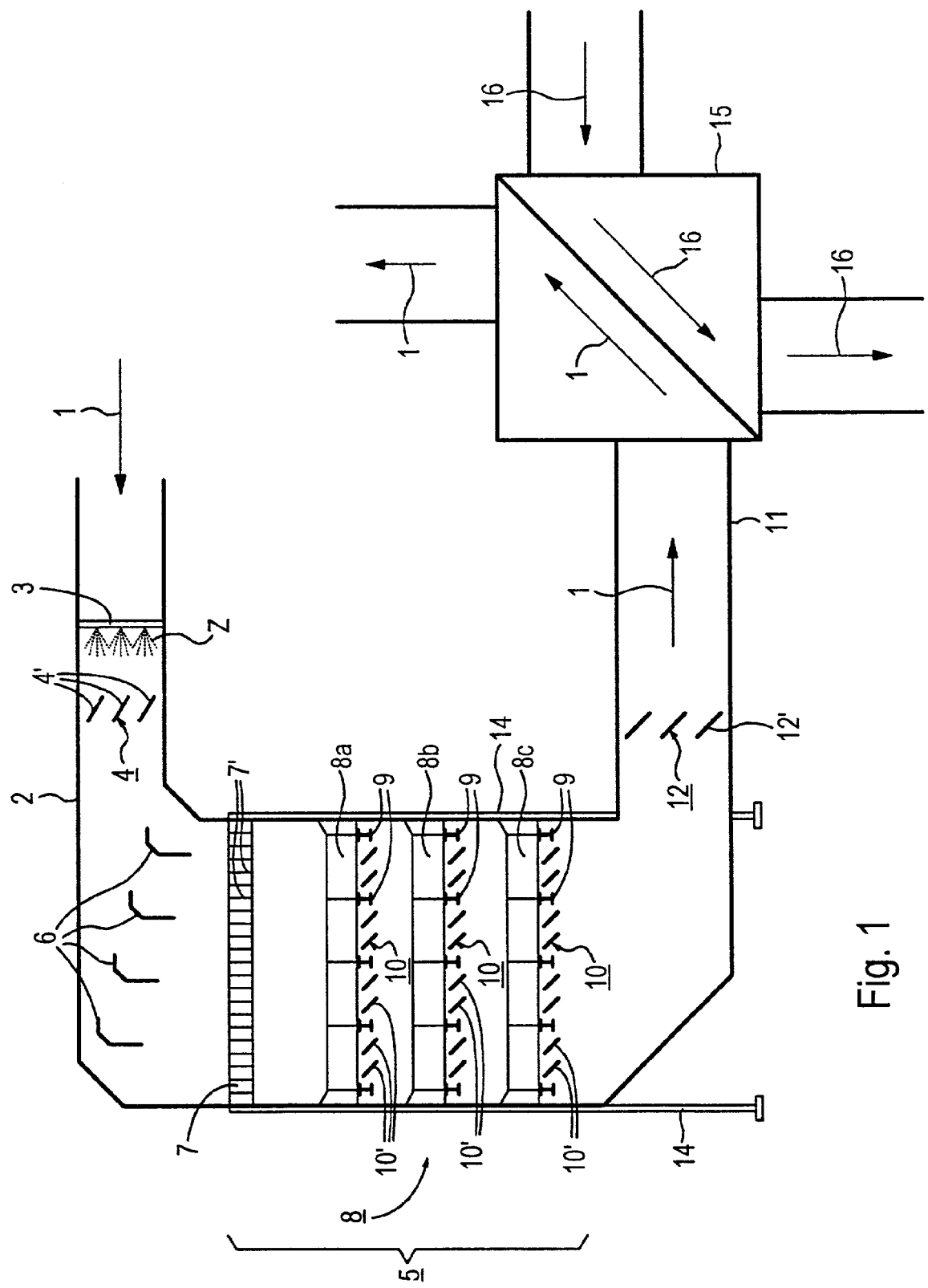
FIG. 1 is a diagrammatic section and outline structure of a cleaning device with additional mixers downstream of a catalytic converter of layered structure.

Referring now to the figures of the drawing in detail and first, particularly, to FIG. 1 thereof, there is shown plant portion wherein flue gas 1 arrives from a non-illustrated steam generator of a power plant with a thermal output of, for example, a few MW to more than 1000 MW. The flue gas 1 flows through a flue-gas passage 2 to an injection apparatus 3. The steam generator may be fired with coal, waste and/or oil, so that at the high combustion temperatures which are nowadays customary, nitrogen oxides are in each case formed and flow out together with the flue gas 1. The injection apparatus 3 is arranged in a horizontal section of the flue-gas passage 2, upstream of a (second) mixer 4 with lamellae 4' which are inclined with respect to the flowing flue gas 1 and do not move. The mixer 4 mixes a reducing agent, for example ammonia, with the flue gas 1. For this purpose, by way of example, an additive Z which releases the reducing agent, for example urea, is injected into the flue-gas passage 2.

The flue-gas passage 2 opens into the top end of a catalyst tower 5, the cross section of which is considerably wider than that of the flue-gas passage 2. The catalyst tower 5 has a height of up to 30 m or more and it is supported by vertical legs 14. Diverter walls 6 are arranged in the transition area from the flue-gas passage 2 to the catalyst tower 5, which walls firstly ensure that the flowing flue gas or flue-gas flow 1 is diverted with little loss and, secondly, prevent the gas mixture of flue gas 1 and reducing agent from segregating.

At the point where the flue-gas passage 2 opens into the catalyst tower 5, a rectifier 7, which substantially suppresses turbulence in the flowing flue gas 1 or flue-gas flow, is provided transversely with respect to the flowing flue gas 1. As a result, erosion phenomena at the point where the flue gas 1 enters a top catalytic-converter layer 8a of a catalytic converter 8 which is of modular structure are reduced to an acceptable level. Each catalytic-converter layer 8a to 8c rests on a respective support 9. The supports 9 are held transversely in the catalyst tower 5, and the catalytic converters extend across the entire cross section of the catalyst tower 5. In both exemplary embodiments, the catalytic converter 8 comprises three layers 8a to 8c in each case, and each layer has four by four catalytic converter modules.

A mixer 10, which is expediently likewise in lamella form and therefore static, comprising, for example, lamellae 10', which are arranged parallel to one another, are preferably 50 mm to 200 mm wide and are made from sheet-metal strips with a thickness of 1 mm to 4 mm, is provided beneath each catalytic-converter layer 8a to 8c. The lamellae 10'—like the lamellae 4' of the mixer 4—are pivoted about their longitudinal axis and are inclined with respect to the flowing flue gas 1. This ensures that the flue gas 1 is mixed together again after it has passed through each catalytic-converter layer 8a to 8c. In this way, in particular the formation of sections of flue gas with an above-average level of reducing agent is prevented.

After the flue gas 1 has emerged from the bottom layer 8c of the catalytic converter 8, the flowing flue gas 1 is diverted into a flue-gas passage 11 which is once again horizontal. Turbulence which is generated in the process is reinforced, in a (first) mixer 12, which is arranged downstream of the catalytic converter 8 as seen in the direction of flow and has lamellae 12' which are preferably likewise inclined with respect to the flowing flue gas 1, so that the flue gas 1 with a low nitrogen oxide content flows through the flue-gas passage 11 to an air preheater 15 as a practically homogeneous mixture. In the air preheater 15, the flue gas, which still reaches this preheater at a temperature of more than 300° C., heats combustion air 16, which is fed to a combustion chamber in a steam generator, in a manner which is not illustrated in more detail. As an alternative to the air preheater 15, it is also possible for another installation part onto which the flue gas 1 flows to be arranged downstream of the catalytic converter 8.

Figure 2:
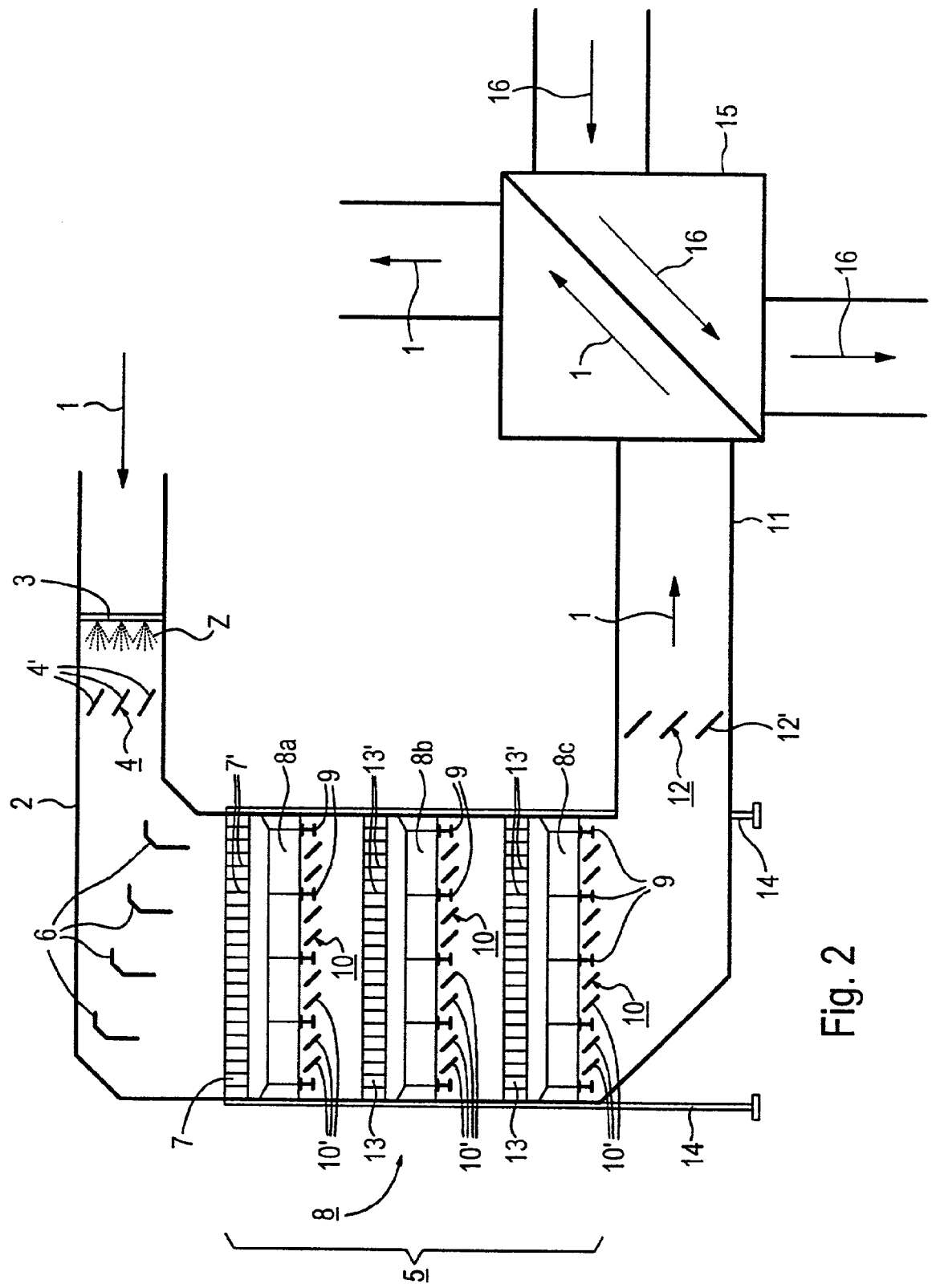
FIG. 2 is a similar view of a cleaning device with additional mixers and rectifiers in the catalytic converter which is of layered structure.

Although the actual distance between successive layers 8a to 8c of the catalytic converter 8 is of the order of magnitude of 1 m to 2 m, it is possible for the flowing flue gas 1 to come into contact with the following catalytic-converter layer 8b or 8c at an inclined angle at some locations. This may give rise to undesirably high levels of erosion, in particular in a catalytically active surface layer. To reliably avoid this, in the exemplary embodiment shown in FIG. 2, a rectifier 13, which in each case forces all the sections of the flue-gas flow into an axially parallel orientation, is arranged upstream of each layer 8b and 8c of the catalytic converter 8.

These rectifiers 13—like the mixers 4, 10, 12 and the rectifier 7—are likewise of lamella design and are composed, for example, of lamellae 13' which are 50 mm to 200 mm wide and are made from sheet-metal strips which are 1 mm to 4 mm thick. The lamellae 13' of the rectifiers 13 and the lamellae 7' of the rectifier 7 are, however, without exception parallel to the flowing flue gas 1 and form either a grate comprising parallel lamellae 7' or 13' or a grid of lamellae 7' or 13' which cross one another. If the rectifiers 13 are designed as a grate, successive grates are pivoted with respect to one another about an axis which is parallel to the flue-gas flow, for example, through 90°.

The use of the mixers 10 and/or, very particularly, the use also of the mixer 12, significantly increases the operational reliability of the deNOxing installation (catalytic converter) and, in particular, also the operational reliability of the air preheater 15 which lies further downstream in the flowing flue gas 1. This is important in particular for deNOxing installations with high nitrogen oxide separation rates.

The cleaning device also remains economical, since the mixers 10 and 12 which are additionally used, as well as the rectifiers 13 which are sometimes required, are inexpensive and reliable components which are easy to install. Moreover, the pressure drop caused by these components is considerably less than the pressure drop in the individual layers 8a to 8c of the catalytic converter. As a result of good mixing of the gases, it is even possible, in some cases—by suitably optimizing the installation—to reduce the mass of catalyst compared to a cleaning device without the mixers 12 and/or 10.

I claim:

1. A device for cleaning flue gas, comprising:
    a flue gas passage for conducting flue gas in a given flow direction;
    an apparatus for injecting an additive adapted to release a reducing agent in said flue gas passage;
    at least one catalytic converter including a last catalytic converter for reducing nitrogen oxides disposed in said flue gas passage; and
    a mixer for rendering a mixing of the flue gas with the reducing agent more uniform disposed downstream of said last catalytic converter in the given flow direction, wherein said mixer comprises a plurality of immovable lemellae, disposed obliquely with respect to a flow gas flow.

2. The cleaning device according to claim 1, wherein said mixer is a first mixer, and the cleaning device further has a second mixer and a first flow rectifier disposed in series in said flue gas passage between said injection apparatus and said catalytic converter.

3. The cleaning device according to claim 2, which comprises a diverter apparatus for the flowing flue gas disposed between said second mixer and said first flow rectifier.

4. The cleaning device according to claim 1, wherein said mixer is a first mixer, and wherein a flow guiding device selected from the group consisting of a second mixer and a first flow rectifier is disposed in said flue gas passage between said injection apparatus and said catalytic converter.

5. The cleaning device according to claim 1, wherein said catalytic converter is composed of a plurality of catalytic-converter layers, and said mixer includes a respective mixer disposed downstream of each catalytic-converter layer.

6. The cleaning device according to claim 5, which comprises a rectifier for the flowing flue gas disposed in said catalytic converter upstream of at least one of said catalytic-converter layers.

7. The cleaning device according to claim 6, wherein said flow rectifier is selected from the group consisting of lamella rectifiers and grid rectifiers.

8. The cleaning device according to claim 1, wherein said mixer is a static mixer.

9. The cleaning device according to claim 1 in combination with an air preheater connected downstream of said catalytic converter and heated by the flue gas, wherein said mixer is arranged upstream of the preheater in the given flow direction.

10. The cleaning device according to claim 1, wherein said catalytic converter is composed of a plurality of catalytic-converter layers, said mixer is a first mixer including respective mixers assigned to said catalytic converter and respectively disposed downstream of each catalytic-converter layer, and a mixer disposed downstream of said catalytic converter having wider lamellae than said mixers assigned to said catalytic converter.

11. The cleaning device according to claim 10, which comprises a second mixer disposed between said injection apparatus and said catalytic converter and having wider lamellae than said mixers assigned to said catalytic converter.

12. The cleaning device according to claim 1 connected to and configured to clean flue gas from a fossil-fuel-fired steam generator in a power plant.

* * * * *